(12) United States Patent
Shaw et al.

(10) Patent No.: US 11,336,904 B2
(45) Date of Patent: May 17, 2022

(54) VIDEO CODING USING A SALIENCY MAP

(71) Applicant: Hewlett-Packard Development Company, L.P., Spring, TX (US)

(72) Inventors: Mark Q. Shaw, Boise, ID (US); Jan P. Allebach, West Lafayette, IN (US); Edward J. Delp, West Lafayette, IN (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 79 days.

(21) Appl. No.: 16/675,583

(22) Filed: Nov. 6, 2019

(65) Prior Publication Data

US 2020/0077104 A1 Mar. 5, 2020

Related U.S. Application Data

(62) Division of application No. 15/517,539, filed as application No. PCT/US2014/060933 on Oct. 16, 2014, now Pat. No. 10,531,103.

(51) Int. Cl.
| | |
|---|---|
| *H04N 19/182* | (2014.01) |
| *H04N 19/17* | (2014.01) |
| *H04N 19/167* | (2014.01) |
| *H04N 19/117* | (2014.01) |
| *H04N 19/186* | (2014.01) |
| *H04N 19/82* | (2014.01) |
| *H04N 19/10* | (2014.01) |

(Continued)

(52) U.S. Cl.
CPC ........... *H04N 19/182* (2014.11); *H04N 19/10* (2014.11); *H04N 19/117* (2014.11); *H04N 19/167* (2014.11); *H04N 19/17* (2014.11); *H04N 19/186* (2014.11); *H04N 19/51* (2014.11); *H04N 19/82* (2014.11); *H04N 21/234* (2013.01)

(58) Field of Classification Search
CPC .... H04N 19/182; H04N 19/10; H04N 19/117; H04N 19/167; H04N 19/17; H04N 19/186; H04N 19/51; H04N 19/82; H04N 21/234
USPC ........................................................ 382/254
See application file for complete search history.

(56) References Cited

U.S. PATENT DOCUMENTS

| | | | |
|---|---|---|---|
| 5,686,961 | A | 11/1997 | Gasztonyi et al. |
| 6,490,319 | B1 | 12/2002 | Yang |

(Continued)

FOREIGN PATENT DOCUMENTS

| | | |
|---|---|---|
| TW | 200828979 A | 7/2008 |
| TW | 201233158 A | 8/2012 |

(Continued)

OTHER PUBLICATIONS

Baby ("Synthesis of Reconfigurable Video Compression Modules in Virtex FPGAs for Multiple Fault Repair Mechanism", ICICT 2014) (Year: 2014).*

(Continued)

*Primary Examiner* — Mark Roz
(74) *Attorney, Agent, or Firm* — Brooks Cameron & Huebsch PLLC

(57) ABSTRACT

A video coder includes a processing resource and a non-transitory storage device containing instructions executable by the processing resource to compute a weighted Δ frame based on a saliency map and a Δ frame. The saliency map is to indicate the relative importance of each pixel in a current frame based on its perceptual significance. The Δ frame is to include differences between corresponding pixels in a current frame and a motion predicted frame.

20 Claims, 5 Drawing Sheets

(51) Int. Cl.
    *H04N 19/51* (2014.01)
    *H04N 21/234* (2011.01)

(56) References Cited

U.S. PATENT DOCUMENTS

| | | | |
|---|---|---|---|
| 8,422,546 B2 | 4/2013 | Lin et al. | |
| 2010/0321566 A1 | 12/2010 | Yamamoto | |
| 2011/0255595 A1 | 10/2011 | Zuo et al. | |
| 2012/0256941 A1* | 10/2012 | Ballestad | G06K 9/00234 345/589 |
| 2012/0288189 A1 | 11/2012 | Hu et al. | |
| 2013/0050574 A1 | 2/2013 | Lu et al. | |
| 2014/0269901 A1 | 9/2014 | Shi | |
| 2015/0334422 A1* | 11/2015 | Shaw | H04N 19/85 375/240.16 |

FOREIGN PATENT DOCUMENTS

| | | | | |
|---|---|---|---|---|
| WO | WO-2013189840 A1 * | 12/2013 | | G06K 9/4652 |
| WO | WO-2014/018050 A1 | 1/2014 | | |
| WO | WO-2014/078748 A1 | 5/2014 | | |

OTHER PUBLICATIONS

Achanta et al., "Salient Region Defection and Segmentation," in International Conference on Computer Vision Systems (ICVS '08), vol. 5008, Springer Lecture Notes in Computer Science, pp. 68-75, Springer Berlin / Heidelberg, 2008.

Le Meur, O. et al., "Selective H.264 Video Coding Based on a Saliency Map," Elsevier Science, Jul. 29, 2005, pp. 1-17.

Lee, et al. "Perceptual Video Compression: A Survey," IEEE Journal of Selected Topics in Signal Processing, vol. 6, No. 6, Oct. 2012, pp. 684-697.

PCT Search Report/Written Opinion ~ Application No. PCT/US2014/060933 dated Jun. 30, 2015 ~ 13 pages.

Perazzi et al., "Saliency Filters: Contrast based filtering for salient region detection," in: Computer Vision and Pattern Recognition (CVPR), 2012 IEEE Conference on, 2012, pp. 733-740. doi:10.1109/CVPR.2012.6247743.

Shen et al., "A Unified Approach to Salient Object Detection via Low Rank Matrix Recovery," IEEE Conference on Computer Vision and Pattern Recognition, 2012, 8 p.

* cited by examiner

VIDEO CODING USING A SALIENCY MAP

PRIORITY INFORMATION

This application is a divisional of U.S. National Stage application Ser. No. 15/517,539 filed on Apr. 7, 2017, which claims priority to International Application No. PCT/US2014/060933 filed on Oct. 16, 2014. The contents of which are incorporated herein by reference in its entirety.

BACKGROUND

Compression of video data is becoming more and more prevalent in today's information age. Streaming content, for example, has been made possible as a result of video compression techniques. However, video content is growing at high rate, and the bandwidth requirements to support such video content are staggering.

BRIEF DESCRIPTION OF THE DRAWINGS

For a detailed description of various examples, reference will now be made to the accompanying drawings in which.

DETAILED DESCRIPTION

Figure 1:
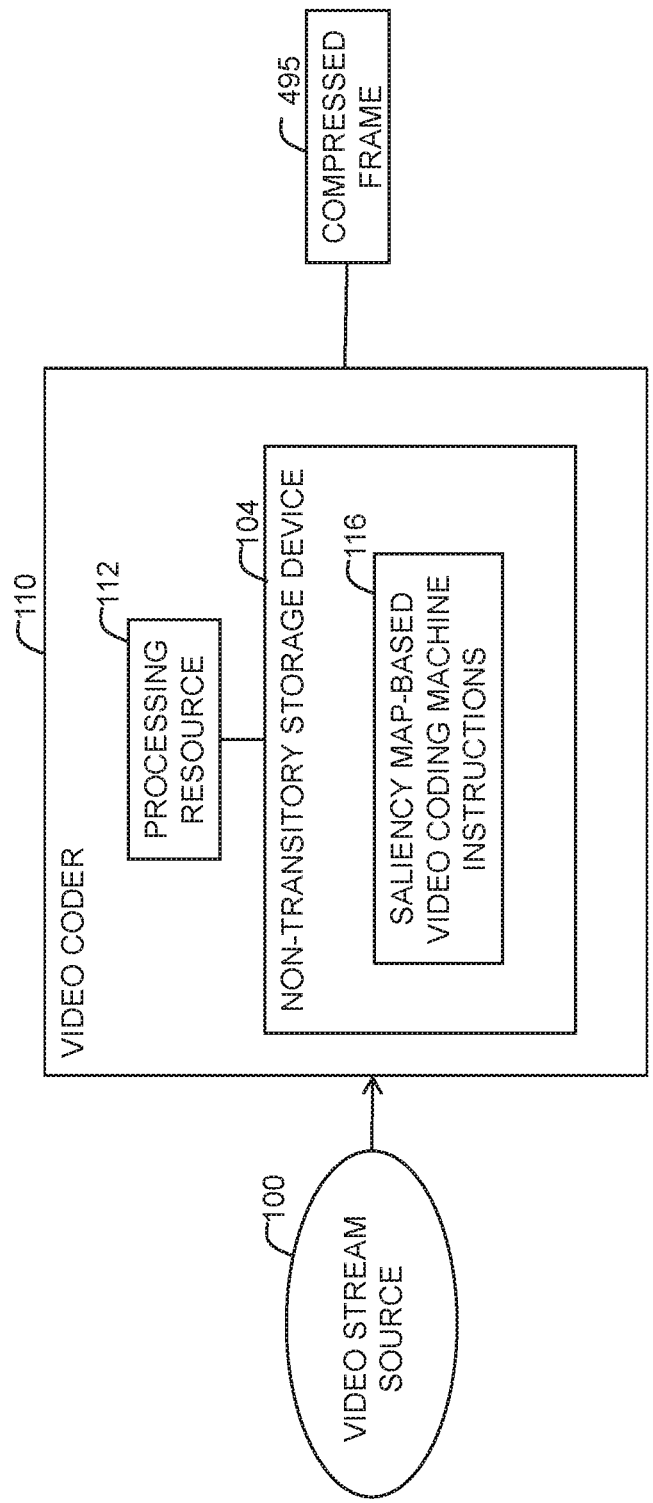
FIG. 1 shows a video coder in accordance with various examples.

Disclosed are techniques to selectively modify a video stream based on a determination of the likely importance of individual pixels within each frame. Less important pixels are less likely to be noticed by a viewer than more important pixels, and are coded differently than the more important pixels. Less important pixels are coded in a way that increases compression gain. Less important pixels may be compressed in a way that results in a higher compression gain, but a lower image quality. However, because the less important pixels are less likely to be noticed, any reduction in image quality for the less important pixels due to the disclosed technique is not likely to be noticed anyway while viewing the video stream. A saliency map is determined for some or all video frames. The saliency map indicates the relative importance of each pixel in the corresponding frame based on its perceptual significance.

A video stream may be characterized as a sequence of frames that when presented sequentially provide a motion aspect to the images of the frames. Implementations of a color contrast sensitivity model can identify regions of high variance with frame-to-frame differences that are visually imperceptible to a human observer with normal color vision. The disclosed compression technique is based on perception principles of color science, and further takes advantage of the nature of block-based progressive video coding techniques.

The examples described herein may selectively discard inter-frame differences based on underlying assumptions about the human visual system for a video compressor/decompressor (CODEC) such as, for instance an MPEG-2 CODEC, although video coding techniques other than MPEG-2 are also possible. MPEG-2 is a standard for the generic coding of moving pictures (e.g., a video stream) and associated audio information. MPEG-2 describes a combination of lossy video compression and lossy audio data compression methods which permit storage and transmission of video streams using storage media and transmission bandwidth.

A human observer's sensitivity to color differences varies as a function of hue, chroma and lightness. Further, some portions of each frame of a video sequence are less likely to be noticed by an observer than other portions. By taking these factors into account, the implementations described herein selectively attenuate inter-frame differences of a video stream based on a variance weighted chromatic activity map. In the case of an MPEG 2 workflow, the attenuated differences then may be transformed using, for instance, a discrete cosine transformation (DCT), and quantized. A discrete cosine transform (DCT) expresses a sequence of finitely many data points in terms of a sum of cosine functions oscillating at different frequencies. DCTs are helpful in numerous applications including lossy compression of audio and images where small high-frequency components can be discarded.

The transformed, quantized video frame data then may be encoded using, for example, a Huffman coding algorithm. Huffman coding is an encoding algorithm that may be used for lossless data compression. Huffman coding includes the use of a variable-length code table for encoding a source symbol where a variable-length code table has been derived in a particular way based on the estimated probability of occurrence for each possible value of the source symbol.

A sequence of video frames may be characterized by relatively little difference from one frame to the next. For example, at a replay speed of 30 frames per second, there may not be much difference between one frame and the next frame $\frac{1}{30}$th of a second later in time. Much of the information that represents one frame will be the same as the information used in the next frame.

The video compression described herein takes advantage of this fact by predicting or estimating motion vectors. A frame may comprise a number of blocks. A block matching Motion Estimation (ME) algorithm may be used to determine the motion vectors from frame to frame to create a motion predicted frame. Each block within a frame may be predicted from a block of equal size in the reference frame. The blocks may not be transformed in any way apart from being shifted to the position of the predicted block. This shift is represented by a motion vector. Many motion compensation schemes allow for the use of a number of different previous or subsequent frames to be used for the motion prediction and not necessarily just an adjacent frame.

Using motion compensation, a video stream may contain some full (reference) frames. The other frames may contain difference information needed to transform the previous frame into the next frame. To exploit the redundancy between neighboring block vectors, the disclosed compression technique encodes the difference between the current and previous motion predicted frames. Further down the encoding pipeline, an entropy coder (e.g., a Huffman coder) may take advantage of the resulting statistical distribution of the motion vectors around the zero-vector to reduce the output size.

Inter-frame video coding takes advantage of the fact that not every pixel within a video stream may change from one frame to the next. By removing the redundancy of unchanging pixels, the video stream may predominantly only code those pixels that change from frame to frame. This results in a significant improvement in the bit rate (e.g., the amount of data needed to encode the video stream frames) and thus an increase in compression gain.

An underlying assumption of some video coding techniques may be that all pixel differences to be encoded from frame to frame are perceptually significant. However, not all color differences are equally likely to be perceived since the human visual system's sensitivity to changes in color varies as a function of lightness, chroma and hue. Further, some pixels in a frame are not likely to be noticed by an observer based on the content of the frame itself. For example, if the observer is watching a video of a person talking, the observer's attention is most likely to be on the person's face and not the background which may not even be in focus or may be relatively dark.

Developments in color science have led to the standardization of color difference equations, known as, for example, the CIE $\Delta E_{ab}$, $\Delta E_{94}$ and $\Delta E_{2000}$ equations. In order to use such a color difference model, the colors to be compared are converted from the source color space into a perceptual color space, such as, for example, CIE Lab.

The CIE Lab color space is a perceptual color space with dimension L for lightness and color-opponent dimensions a and b. The CIE Lab color space is derived from a "master" CIE 1931 XYZ color space. The CIE 1931 XYZ color space predicts which spectral power distributions will be perceived as the same color, but is not perceptually uniform. CIE Lab creates a space that can be computed from the XYZ space and is more perceptually uniform. Perceptually uniform means that a change of the same amount in a color value should produce a change of about the same visual importance. When storing colors in limited precision values, this can improve the reproduction of tones. The CIE Lab space is defined relative to a reference white point of the XYZ data from which the Lab values were converted.

The human eye has photoreceptors for medium- and high-brightness color vision, with sensitivity peaks in short (S, 420-440 nm), middle (M, 530-540 nm), and long (L, 560-580 nm) wavelengths (there are also low-brightness, monochromatic "night-vision" receptors, called rod cells, which have peak sensitivity around 490-495 nm). Thus, in principle, three parameters referred to as tristimulus values can describe a color sensation. These tristimulus values of a color can be conceptualized as the amounts of three primary colors in a tri-chromatic additive color model. Associating tristimulus values with colors is the job of a color space. CIE XYZ, one of many such spaces, may serve as the basis from which other color spaces are defined. A color-matching function associates specific tristimulus values with specific colors.

The disclosed examples may model the perception of a human observer with normal, two degree color vision using, for example, a simplified form of the CIE Lab equations shown in equations 1-3 below, where X, Y, Z are the tristimulus values of the color under observation, and $X_n$, $Y_n$, $Z_n$ are the tristimulus values of the reference white point. The L*, a*, b* coordinates correspond to the lightness, red-green opponent channel, and blue-yellow opponent channel respectively.

$$L^* = 116\left(\frac{Y}{Y_n}\right)^{\frac{1}{3}} - 16 \qquad \text{Eq. (1)}$$

$$a^* = 500\left[\left(\frac{X}{X_n}\right)^{\frac{1}{3}} - \left(\frac{Y}{Y_n}\right)^{\frac{1}{3}}\right] \qquad \text{Eq. (2)}$$

$$b^* = 200\left[\left(\frac{Y}{Y_n}\right)^{\frac{1}{3}} - \left(\frac{Z}{Z_n}\right)^{\frac{1}{3}}\right] \qquad \text{Eq. (3)}$$

For a pixel in the video stream, once CIE Lab coordinates (L*, a*, b*) have been computed for two different samples, a color difference may be computed using color difference equations. The $\Delta E_{94}$ and $\Delta E_{2000}$ equations may be used, for instance, because they attempt to account for the non-linear dependency on hue and chroma of the samples. The $\Delta E_{94}$ color difference equation, for example, may be calculated using equation 4 below.

$$\Delta E_{94} = \sqrt{\left(\frac{\Delta L^*}{K_1}\right)^2 + \left(\frac{\Delta C^*_{ab}}{1+K_1 C^*_1}\right)^2 + \left(\frac{\Delta H^*_{ab}}{1+K_2 C^*_2}\right)^2} \qquad \text{Eq. (4)}$$

where:

$$\Delta L^* = L^*_1 - L^*_2$$

$$C^*_1 = \sqrt{a^{*2}_1 + b^{*2}_1}$$

$$C^*_2 = \sqrt{a^{*2}_2 + b^{*2}_2}$$

$$\Delta C^*_{ab} = C^*_1 - C^*_2$$

$$\Delta H^*_{ab} = \sqrt{\Delta E^{*2}_{ab} - \Delta L^{*2} - \Delta C^{*2}_{ab}} = \sqrt{\Delta a^{*2} + \Delta b^{*2} - \Delta C^{*2}_{ab}}$$

$$\Delta a^* = a^*_1 - a^*_2$$

$$\Delta b^* = b^*_1 - b^*_2$$

and further where the weighting factors ($K_L$, $K_1$, $K_2$) depend on the application (i.e., nature and content of a video stream).

FIG. 1 shows an example of a video coder 110 in accordance with various examples. Video coder 110 receives an input video stream source 100 and compresses it as described herein. The video coder 110 performs various operations to compress the video stream source 100. The video coder 110 produces an encoded compressed frame 495. The encoded compressed frame 495 can be transmitted to a receiving/playback device or stored for subsequent playback. A playback device may decode the compressed frame for playback through a video monitor such as a television, computer display, etc.

The video coder 110 shown in FIG. 1 includes a processing resource 112 coupled to a non-transitory storage device 114 which includes saliency map-based video coding machine instructions 116. The saliency map-based video coding machine instructions 116 are accessible to and executable by the processing resource 112. The processing resource 112 may be a single processor, a multi-core processor, a single computer, a network of computers. The non-transitory storage device 112 may comprise volatile storage (e.g., random access memory), non-volatile storage (e.g., magnetic storage, optical storage, solid-state storage, etc.) or combinations thereof.

Upon execution of the saliency map-based video coding machine instructions 116, the processing resource 112 implements some or all of the functionality described herein to compress the video stream source 100. For example, the saliency map-based video coding machine instructions 116 cause the processing resource 112 to compress the video stream source 100 based, at least in part, on the determined importance of each pixel within its frame. The saliency map-based video coding machine instructions 116 cause the processing resource 112 to compute the encoded compressed frame 495 based, at least in part, on a saliency map and a Δ frame. The saliency map indicates the relative importance of each pixel in a current frame based on its perceptual significance, and the Δ frame includes differences between corresponding pixels in a current frame and a motion predicted frame.

Any of a variety of techniques for generating a saliency map can be employed. The saliency map generation technique may be implemented by the video coder 110 (e.g., by the saliency map module 380 of the video coder as discussed below with regard to FIG. 3). In one example of generating a saliency map, the technique may include reading in a frame of an image sequence. The technique further may include computing a feature for each pixel in the frame. The computed feature for any given pixel can be any value that indicates, to at least some extent, the likely importance of that pixel in the overall frame. For example, the computed feature may be distance (e.g., measured in units of pixels) between the pixel for which the feature is being computed and the center of the frame. Pixels closer to the center of the frame may be more important than pixels farther away from the center. Other saliency map generation techniques may compute other types of features. For example, faces in a frame may be more important than other areas of the frame, and thus the feature computation operation may include a facial recognition algorithm. Contrast can also be used in the computation of features in a saliency technique.

The saliency map generation technique also may include the generation of a saliency weighting for each pixel based on the computed features. The nature of the generation of the saliency weightings depends on the type of features that were computed. For example, if the feature is pixel distance to the center of the frame, the weighting for a given pixel may reflect how close that pixel is to the center relative to the other pixel-to-center distances. By way of an additional example, if facial recognition is included, saliency weightings for pixels within a detected may be weighted higher than non-face pixels.

Figure 2:
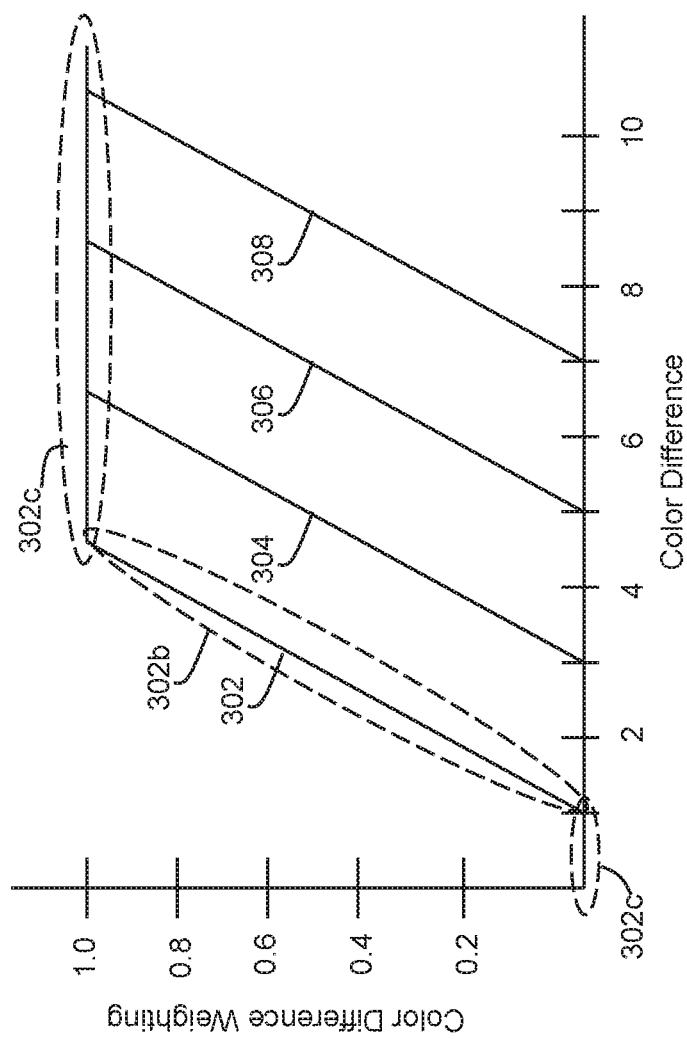
FIG. 2 shows various tone map functions in accordance with various examples.

FIG. 2 illustrates four tone map functions 302, 304, 306, and 308, although other examples may use a different number of tone map functions. In general, any number (e.g., 2 or more) of tone map functions may be used. Each tone map specifies a relationship between a color difference weighting and a color difference between corresponding pixels in a current frame and a motion predicted frame.

The theoretical visual tolerance for a just noticeable difference (JND) for a human observer is considered to be equivalent to one $\Delta E_{94}$ for large area solid color patches. In the present example, small (pixel sized) colors may change as a function of time. For that reason, a variable margin of error may be allowed. The plurality of tone map functions 302-308 are usable to map color difference values for each pixel to a normalized output between zero (0) and one (1).

In the example of FIG. 2, the color difference weightings vary from 0 to 1. A weighting of 0 means that that the color difference is not preserved resulting in the color difference effectively being reduced to zero. A weighting of 1 means that the color difference is fully preserved. Interim values between 0 and 1 weight the color difference accordingly.

In the example of FIG. 2, each tone map function includes three linear portions. For example, tone map function 302 includes a first linear portion 302a that specifies a 0 weighting for smaller color differences, for example, color differences below a first threshold (a color difference of 1 in this example). Tone map function 302 includes a second linear portion 302b that monotonically increases between the first threshold and color differences at a higher threshold (a color difference of 5 in this example). A third linear portion 302c is also provided for tone map function 302 in this example that specifies a weighting of 1 for larger color differences, for example, color differences above the higher threshold. The other three tone map functions 304-308 are similar, albeit with different lower and/or higher thresholds. Other tone map functions are suitable as well. For example, tone map functions that implement non-linear functions such as a cumulative Gaussian function may be acceptable as well for this purpose.

Tone map function 302 indicates that smaller color differences may be preserved more than color differences associated with tone map functions 304-306. Tone map functions 304 preserves smaller color differences more than functions 306 and 308 but less than function 302. Similarly, tone map function 306 preserves smaller color differences more than function 308 but less than functions 302 and 304.

In accordance with the disclosed examples, any given pixel to be coded is coded based on one of the available tone map functions 302-308 that itself is selected based on a saliency map value for that particular pixel. In some examples and on a pixel-by-pixel basis, the video coder 110 determines which tone map function to select for each such pixel. The selected tone map functions then are applied to the color differences of a color difference image to produce a color difference image.

Tone map function selection is based on the saliency map for that particular frame. As explained above, the saliency map indicates the relative importance of each pixel in the current frame based on its perceptual significance. For a given pixel in the current frame designated by the saliency map to have a higher relative importance than another pixel, the video coder 110 selects a tone map function for the former pixel that preserves smaller color differences than a tone map selected for the latter pixel, thereby better preserving video quality for pixels determined to be of higher importance.

In some examples, the video coder 110 selects a tone map function out of at least four tone functions (e.g., tone map functions 302-308), which may be stored in the non-transitory storage device 114. In other examples, only two tone map functions may be provided and thus video coder 110 will select between two tone map functions. In general, any number of tone map functions (two or more) is provided and the video coder 110 selects a tone map function for each pixel from however many tone map functions are available for selection.

Figure 3:
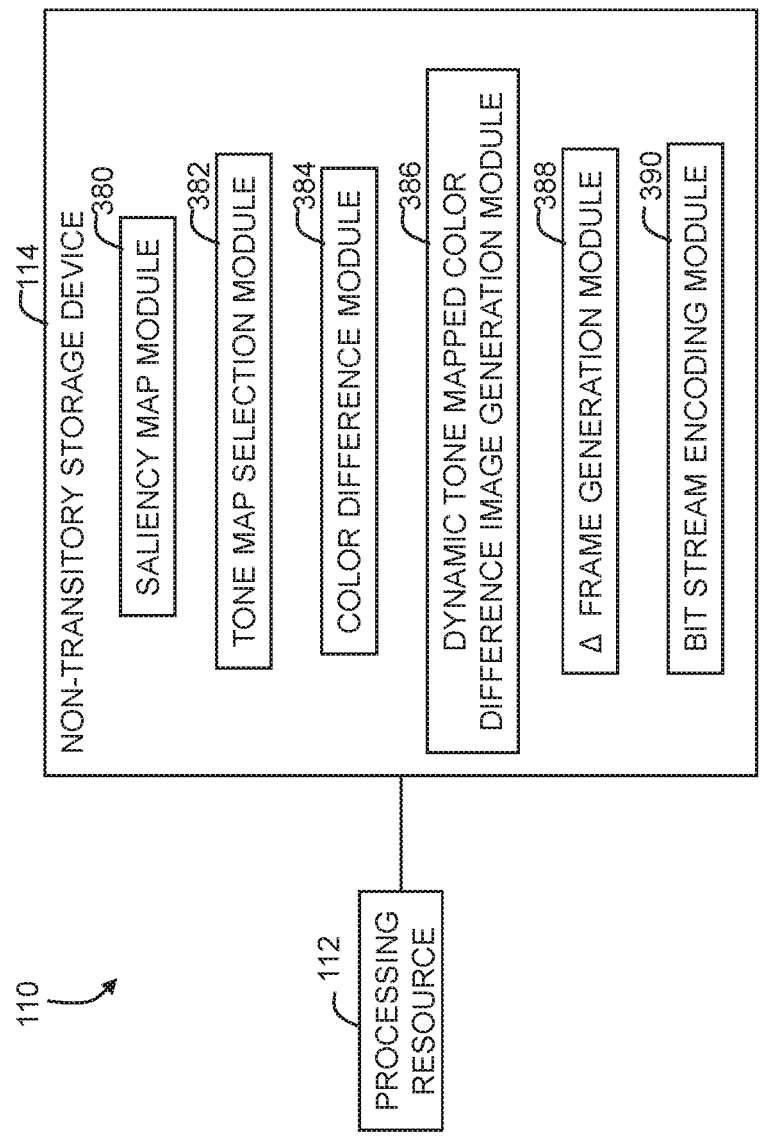
FIG. 3 shows an example of the video coder of FIG. 1.

FIG. 3 illustrates an example of video coder 110 that compresses a video source based on a saliency map. FIG. 3 shows the video coder 110 to include processing device 112 coupled to the non-transitory storage device 114. The machine instructions 116 shown in FIG. 1 are illustrated in FIG. 3 as executable modules 380, 382, 384, 386, 388, and 390. Different modules may be provided as desired, and two or more of the modules may be implemented as single module. The functions attributed to each executable module below are implemented as the processing resource 112 executing the corresponding module. Thus, all references herein to an operation performed by a module include the processing resource 112 performing that operation upon execution of the module.

The saliency map module 380 determines a saliency map for a current frame. As explained previously, the saliency map indicates the relative importance of each pixel in the current frame based on its perceptual significance. Based on the saliency map determined for the current frame, the tone map selection module 382 selects one of a plurality of tone map functions. Each tone map function defines a relationship between a normalized output weighting and a color difference between the current frame and a motion predictive frame.

The color difference module 384 determines color difference values between corresponding pixels in the current and motion predicted frames to produce a color difference image. The selected tone map function is applied by the dynamic tone mapped color difference image generation module 386 to the color difference image to generate a dynamic tone mapped color difference image. The dynamic tone mapped color difference image includes color difference weightings from the tone map function selected for the color difference of each pixel.

The Δ frame generation module 388 determines a weighted Δ frame by multiplying the dynamic tone mapped color difference image and a Δ frame. The Δ frame includes differences between corresponding pixels in the current and motion predicted frames. The bit stream encoding module 390 encodes a bit stream based on the weighted Δ frame. The encoded bit stream (i.e., the compressed video sequence) may be transmitted to a playback device for decoding and playback or stored for subsequent decoding and playback.

In some implementations, a saliency map is determined for multiple frames of a video sequence. A separate saliency map may be determined for each and every frame of a video sequence. In other implementations, saliency maps are not determined for every frame. For example, a saliency map may be determined for every n frames (where n=1, 2, 3, 4, etc.). By way of a further example, a saliency map may be determined for every 30th frame (n=30). A saliency map may be computed when a significant change occurs in the video stream (e.g., more than a threshold number of delta color values between current pixels and corresponding pixels in a motion predicted frame are in excess of a threshold) such as might occur for a scene change, etc. As such, the other frames for which a saliency map is not specifically computed may use a previously computed saliency map.

Figure 4:
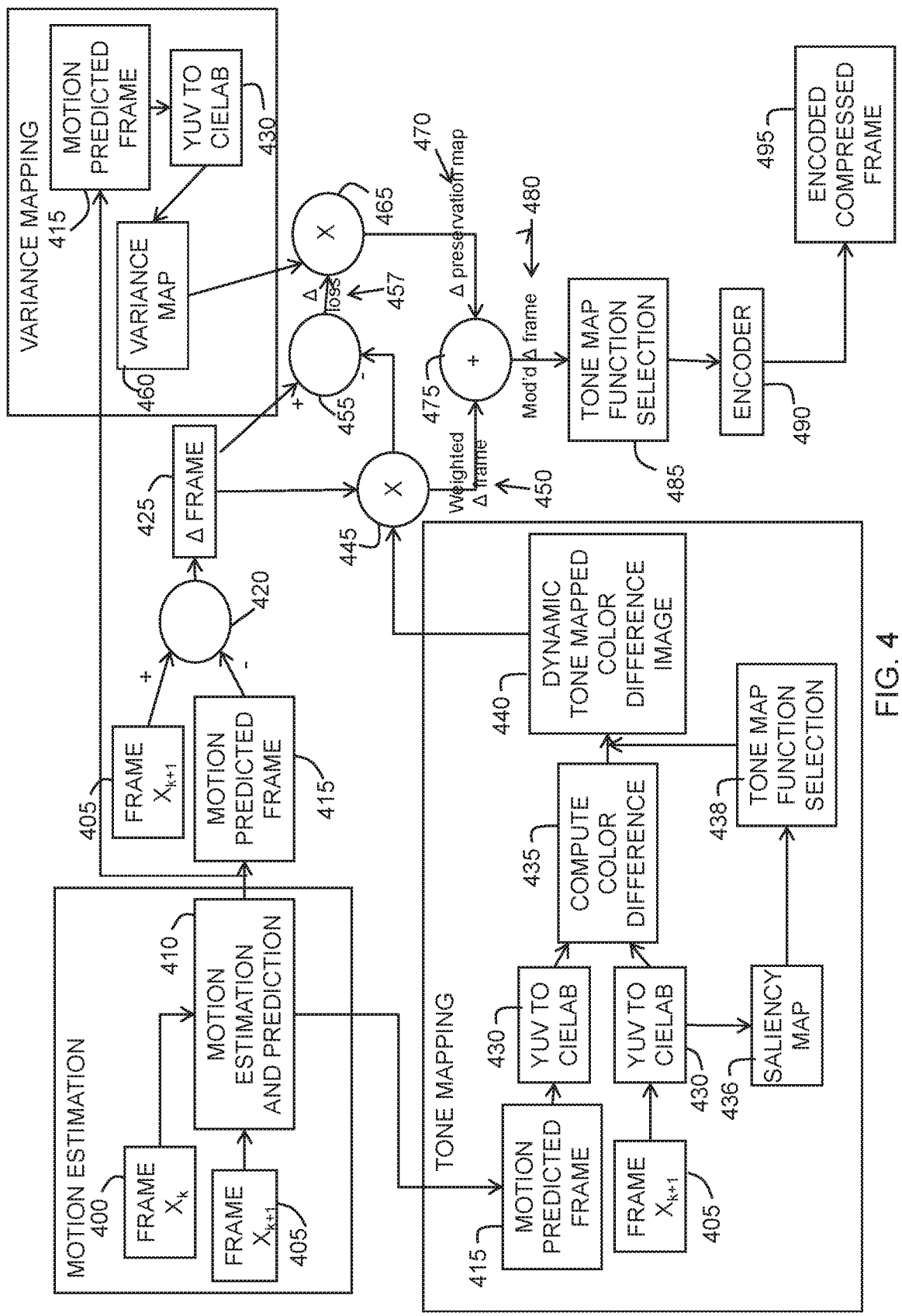
FIG. 4 shows a flow diagram of an example of the coding process in accordance with various examples.

FIG. 4 illustrates one example of a workflow diagram for video coder 110 according to an example. As shown, the workflow may comprise a motion estimation function, a tone mapping function, a variance mapping function, and multiple summation, difference, and multiplication functions. The workflow may receive as input a current frame ($x_{k+1}$) 405 and a reference frame ($x_k$) 400 and determine a modified Δ frame 480 to be encoded. An example of the work flow to obtain the modified Δ frame 480 is described below. It should be noted that the reference frame may be a preceding frame or other known frame in relation to the current frame.

Initially, the workflow may perform a motion estimation and prediction procedure at block 410 using the current frame 405 and its reference frame 400 as input to create a motion predicted frame 415. The motion estimation and prediction block 410 may use, for example, a Motion Estimation (ME) algorithm to determine the motion vectors from frame to frame to create the motion predicted frame 415. The motion estimation algorithm may be block-based such that blocks within the frame are estimated until all the blocks of a frame have been estimated. Any of a variety of motion estimation algorithms may be implemented.

The motion predicted frame 415 then may be used to determine the differences with the current frame 405 via difference function 420. The result from the difference function 420 is a Δ frame 425. The Δ frame 425 therefore includes differences between corresponding pixels in the current frame and the motion predicted frame.

The motion predicted frame 415 also may be used by the tone mapping function to determine a dynamic tone mapped color difference image 440. The motion predicted frame 415 and current frame 405 may be converted from a source color space such as, for instance, YUV to a perceptual color space such as, for instance, CIE Lab at block 430 using the ITU-R Recommendation BT.601 (or REC 601) primary values and respective white point in which the YUV reference [1,0,0], for example, may be assumed to be the white point of the scene or the respective color space for that video coding standard.

The YUV model defines a color space in terms of one luminance (Y) component and two chrominance (UV) components. YUV is a color space that encodes a color image or video taking human perception into account. YUV allows for reduced bandwidth for chrominance components. The term YUV is also used to describe file formats that are encoded using YCbCr. YCbCr may be used for digital encoding of color information suited for video compression and transmission such as MPEG.

ITU-R Recommendation BT.601 is a standard by the International Telecommunication Union (ITU)-Radio-communications sector for encoding interlaced analog video signals in digital video form. It includes methods of encoding 525-line 60 Hz and 625-line 50 Hz signals, both with 720 luminance samples and 360 chrominance samples per line. The color encoding system is known as YCbCr 4:2:2. For a pair of pixels, the data are stored in the order Y1:Cb:Y2:Cr, with the chrominance samples co-sited with the first luminance sample.

Once the color data for the current frame 405 has been converted to the perceptual color space, by for example, the YUV-to-CIELab color conversion procedure at block 430b, a saliency map is computed based on the color data for the current frame. An example of the computation of a saliency map to indicate the relative importance of the pixels in the current frame is provided above. The saliency map from block 436 then is used to a select tone map function at 438 for each pixel (e.g., on a pixel-by-pixel basis) in the current frame. That is, different pixels may be determined to have different tone map functions.

In one example of the selection of a tone map function, a tone map function is selected based on the following equation:

$$1-0.25k \leq S(x,y) \leq 1-0.25(k-1)$$

where k is an index that identifies each tone map function. With four tone map functions 302-208, k=1, 2, 3, 4, respectively. That is, k=1 refers to tone map function 302, k=2 refers to tone map function 304, k=3 refers to tone map function 306, and k=4 refers to tone map function 308. S(x,y) refers to the saliency value from the saliency map (S) at pixel coordinate x,y. Each saliency value is in the range from 0 to 1. The tone map function to be selected is the function that results in a true evaluation of the equation above given the saliency value. For example, if the saliency value S(x,y) is 0.6, the only value of k that results in a true evaluation of the equation above is k=2, and thus the tone map function corresponding to k=2 (tone map function 306) is selected for that particular pixel.

In addition to determining the saliency map at 436 and selecting a tone map function based on the saliency map at 438, the color differences between each pixel of the motion predicted frame 415 and the current frame 405 may be calculated at block 435 using, for example, the $\Delta E_{94}$ color difference equation previously described. The selected tone map function is applied to the output of the color difference equation to yield the dynamic tone mapped color difference image 440 of pixel weightings.

The tone mapped color difference image 440 and the Δ frame 425 then may be multiplied pixel-by-pixel at block 445 to obtain the weighted Δ frame 450. Next, the difference between the Δ frame 425 and the tone mapped color difference image 440 may be calculated at block 455 and the result termed the Δ loss 457.

A spatial variance map 460 ($C_{map}$) may be obtained by color converting the motion predicted frame 415 at block 430. The variance map 460 then may be multiplied at block 465 by Δ loss 457. The resulting image, called the Δ preservation map 470, represents pixels that have been removed in the weighted delta map but have been deemed important enough to be added back at block 490.

Preservation of the color differences in smooth regions of the frame may be attained by applying a pixel-by-pixel summation at block 475 of the weighted Δ frame 450 and the Δ preservation map 470, yielding a modified Δ frame 480. This is possible because the detail and texture of the video stream may mask the perceptual visibility of the change in the color differences. Therefore, this workflow enables the selective compression of video content based on regions that have small inter-frame color differences and medium to high variance.

The modified Δ frame 480 pixels may then be transformed and quantized at block 485 using, for example, an MPEG-2 DCT transformation and quantization scheme, and encoded at block 490 using, for example, Huffman Coding. The end result is an encoded compressed frame 495.

Figure 5:
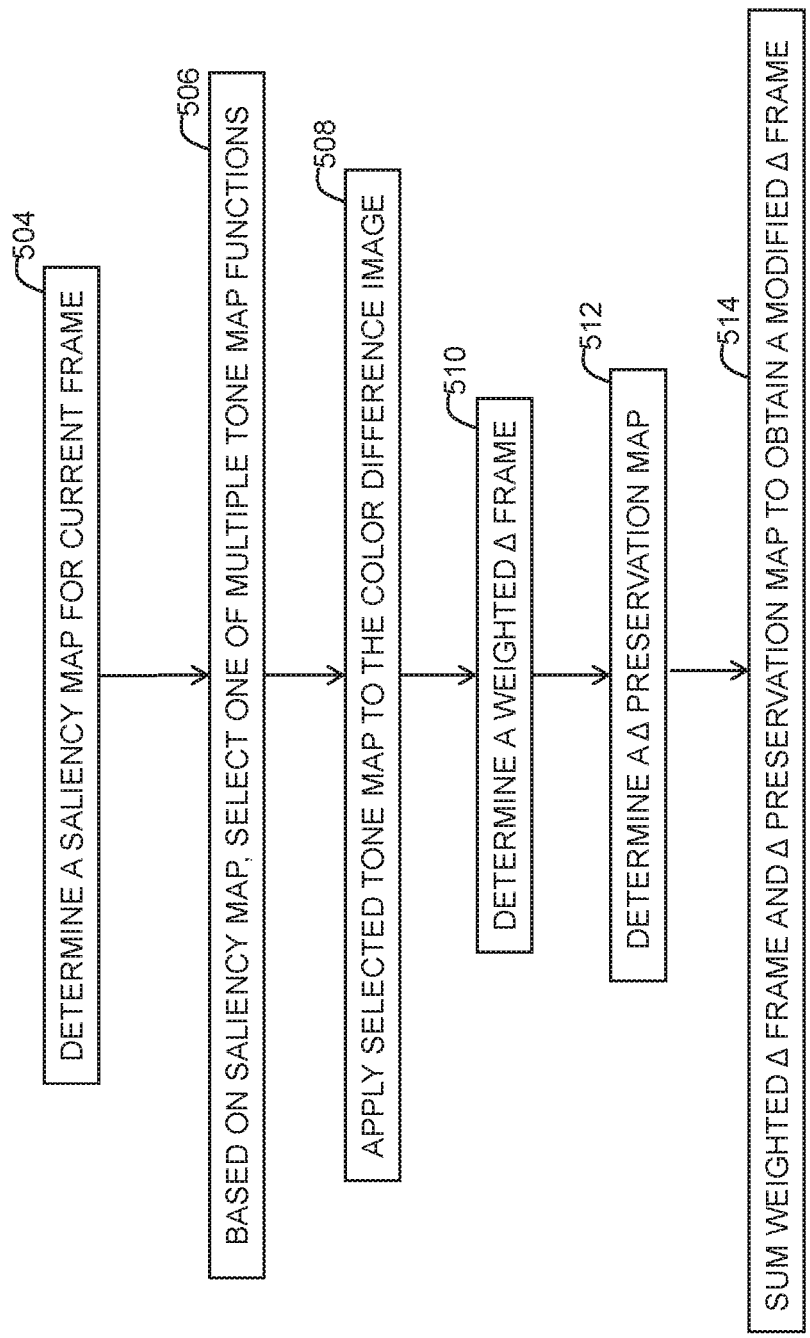
FIG. 5 shows a method in accordance with various examples.

FIG. 5 illustrates a method in accordance with various examples. The operations shown in FIG. 5 may be performed in the order shown, or in a different order. Further, two or more of the operations may be performed in parallel rather than sequentially.

At 504, the method includes determining (e.g., using the saliency map module 380) a saliency map for the current frame. As explained above, the saliency map indicates the relative importance of each pixel in the current frame based on its perceptual significance. This operation may be performed by the saliency map module 380. Based on the determined saliency map, the method further includes at 506 selecting (e.g., using the tone map selection module 382) one of a plurality of tone map functions. Each tone map function comprises a function in which color differences map to a normalized output.

At 508, the method may include applying the selected tone map to a color difference image (which includes color difference values between each pixel in a current frame and a corresponding pixel in a motion predicted frame) to generate a dynamic tone mapped color difference image 440 that includes normalized values for the pixels. This operation may be performed by the dynamic tone mapped color difference image generation module 386. At 510, the method further may include determining a weighted Δ frame by multiplying the dynamic tone mapped color difference image and a Δ frame. The Δ frame includes differences between corresponding pixels in the current and motion predicted frames. The method continues at 512 by determining a Δ preservation map by multiplying a variance map of the motion predicted frame by the difference between the weighted Δ frame and the Δ frame (the difference shown as the loss map 457). At 514, the method may include summing the weighted Δ frame and the Δ preservation map to obtain a modified Δ frame. The generation of Δ frames and modified Δ frames, as well as weighted Δ frames, may be performed by the Δ frame generation module 388.

The above discussion is meant to be illustrative of the principles and various implementations described above. Numerous variations and modifications will become apparent to those skilled in the art once the above disclosure is fully appreciated. It is intended that the following claims be interpreted to embrace all such variations and modifications.

What is claimed is:

1. A video coder, comprising:
 a processing resource; and
 a non-transitory storage device containing instructions executable by the processing resource to:
   determine a saliency map of each pixel within a frame of a video stream;
   select a tone map function from a plurality of tone map functions for each respective pixel within the frame based on the saliency map of each pixel within the frame;
   determine color difference values between each pixel of the frame and corresponding pixels between the frame and a motion predicted frame to generate a tone mapped color difference image;
   determine a weighted delta frame by multiplying the tone mapped color difference image and a delta frame;
   encode a bit stream based on the weighted delta frame; and
   compress the bit stream.

2. The video coder of claim 1, including instructions to cause the processing resource to determine the saliency map by computing a feature within each pixel of the frame, wherein the feature within each pixel indicates an importance of each pixel.

3. The video coder of claim 2, including instructions to cause the processing resource to determine the saliency map by generating a saliency weighting for each pixel based on the computed feature within each pixel.

4. The video coder of claim 1, including instructions to cause the processing resource to apply the selected tone map function to each pixel to generate the tone mapped color difference image.

5. The video coder of claim 4, including instructions to cause the processing resource to:
 select a first tone map for a first pixel having a higher relative importance than a second pixel; and
 select a second tone map for the second pixel.

6. The video coder of claim 1, wherein each tone map function of the plurality of tone map functions defines a relationship between a normalized output weighting and a color difference between the frame and a motion predicted frame.

7. The video coder of claim 6, wherein the delta frame includes differences between a pixel in the frame and a corresponding pixel in the motion predicted frame.

8. The video coder of claim 1, including instructions to cause the processing resource to determine the weighted delta frame by multiplying the tone mapped color difference image and the delta frame pixel by pixel.

9. The video coder of claim 1, including instructions to cause the processing resource to compress each frame of the video stream to generate a compressed video stream.

10. A non-transitory storage device containing non-transitory machine-readable instructions that, when executed by a processing resource, cause the processing resource to:
 determine a saliency map of each pixel within a frame of a video stream by:
   computing a feature within each pixel; and
   generating a saliency weighting for each pixel based on the computed feature within each pixel, wherein the saliency map indicates a relative importance of each pixel within the frame;

select a tone map function from a plurality of tone map functions for each respective pixel within the frame based on the saliency map of each pixel within the frame;

determine color difference values between each pixel of the frame and corresponding pixels between the frame and a motion predicted frame to generate a tone mapped color difference image;

determine a weighted delta frame by multiplying the tone mapped color difference image and a delta frame;

encode a bit stream based on the weighted delta frame; and compress the bit stream.

11. The medium of claim 10, including instructions to cause the processing resource to determine a delta loss by calculating a difference between the delta frame and the tone mapped color difference image.

12. The medium of claim 11, including instructions to cause the processing resource to multiply the delta loss with a spatial variance map to obtain a delta preservation map.

13. The medium of claim 12, including instructions to cause the processing resource to color convert the motion predicted frame to determine the spatial variance map.

14. The medium of claim 12, including instructions to cause the processing resource to apply a pixel by pixel summation of the weighted delta frame and the delta preservation map to generate a modified delta frame.

15. The medium of claim 14, including instructions to cause the processing resource to compress the frame of the video stream by transforming the modified delta frame via a transformation and quantization scheme.

16. A method, comprising:
determining, by a video coder, a saliency map of each pixel within each frame of a video stream by:
computing a feature within each pixel of each frame; and
generating a saliency weighting for each pixel of each frame based on the computed feature within each pixel, wherein the saliency map indicates a relative importance of each pixel within each frame;

selecting, by the video coder, a tone map function from a plurality of tone map functions for each respective pixel within each frame based on the saliency map of each pixel within the frame;

determining, by the video coder, color difference values between each pixel of each frame and corresponding pixels between each frame and respective motion predicted frames to generate tone mapped color difference images;

determining, by the video coder, weighted delta frames by multiplying each tone mapped color difference image with a respective delta frame;

encoding a bit stream including each frame of the video stream based on the weighted delta frames; and compressing, by the video coder, the bit stream.

17. The method of claim 16, wherein the method includes determining, by the video coder, the weighted delta frames by multiplying the tone mapped color difference image and the delta frame, wherein the delta frame includes differences between corresponding pixels in each frame and a corresponding motion predicted frame.

18. The method of claim 17, wherein the method includes:
determining, by the video coder, preservation maps by multiplying a variance map of each motion predicted frame by a difference between the weighted delta frames and the delta frames; and
compressing, by the video coder, the bit stream based on the preservation maps.

19. The method of claim 16, wherein the method includes transmitting, by the video coder, the bit stream to a playback device.

20. The method of claim 19, including:
decoding, by the playback device, the bit stream; and
playing, by the playback device, the bit stream.

* * * * *